United States Patent [19]
Kaneyama

[11] Patent Number: 5,932,283
[45] Date of Patent: Aug. 3, 1999

[54] METHOD FOR FABRICATING $SiO_2$ FILM

[75] Inventor: Yoshinobu Kaneyama, Tokyo, Japan

[73] Assignee: NEC Corporation, Japan

[21] Appl. No.: 09/071,414

[22] Filed: May 1, 1998

[51] Int. Cl.[6] ........................................... B05D 5/06
[52] U.S. Cl. ..................... 427/163.2; 427/226; 427/387
[58] Field of Search ................................ 427/226, 163.2, 427/387

[56] References Cited

U.S. PATENT DOCUMENTS 5,358,739  10/1994  Baney et al. ............................. 427/226
5,761,367   6/1998  Matsumoto .......................... 427/163.2

OTHER PUBLICATIONS

"Low Temperature Process Of Silica Waveguides By Teos–03 Atmospheric Pressure CVD"—The 1996 IEICE General Conference, C–230 (1996) (no mo.).

*Primary Examiner*—Janyce Bell
*Attorney, Agent, or Firm*—Ostrolenk, Faber, Gerb & Soffen, LLP

[57] ABSTRACT

Disclosed is a method for fabricating $SiO_2$ film used as the core layer or cladding layer of an optical waveguide that has the steps of: coating a polysilazane solution on a substrate; and sintering the substrate at a predetermined temperature to form $SiO_2$ film on the substrate by using the pyrolysis reaction from polysilazane to $SiO_2$.

5 Claims, 3 Drawing Sheets

1 SUBSTRATE

2 POLYSILAZANE SOLUTION

3 POLYSILAZANE

4 $SiO_2$ FILM

5 $SiO_2$ FILM

METHOD FOR FABRICATING SiO₂ FILM

FIELD OF THE INVENTION

This invention relates to a method for fabricating $SiO_2$ film. and more particularly to, a method for fabricating $SiO_2$ film used as an optical waveguide.

BACKGROUND OF THE INVENTION

Optical communication devices with miniaturized size, reduced cost and multiple functions have been researched and developed. As one example, silica waveguides formed on silicon substrate have been researched. Several methods for fabricating the silica waveguides, such as flame hydrolysis deposition (FHD), low pressure chemical vapor deposition (LP-CVD) and plasma chemical vapor deposition (P-CVD), have been proposed. However, these methods have the problem that film fabricated thereby may include a relatively large strain. A solution to this problem is reported in T. Shimoda et al., "Low Temperature Process of Silica Waveguides by TEOS-$O_2$ Atmospheric Pressure CVD", Proceedings of The 1996 IEICE General Conference, C-230 (1996), where atmospheric pressure CVD(AP-CVD) that is conventionally used to form insulating film in semiconductor process is employed to provide $SiO_2$ film with a reduced strain.

However, such an AP-CVD method has the problem that the throughput must be lowered as $SiO_2$ micro-particles to be generated by vapor-phase reaction are very slowly deposited on the substrate. Therefore, this method is not suitable for mass production and the product obtained becomes thereby costly. Furthermore, the fabricating equipment is also costly as the AP-CVD method requires a severe control in vapor-phase reaction.

SUMMARY OF THE INVENTION

Accordingly, it is an object of the invention to provide a method for fabricating $SiO_2$ film that can provide a higher throughput without requiring expensive equipment.

According to the invention, a method for fabricating $SiO_2$ film used as the core layer or cladding layer of an optical waveguide, comprises the steps of:

coating a polysilazane solution on a substrate; and sintering the substrate at a predetermined temperature to form $SiO_2$ film on the substrate by using the pyrolysis reaction from polysilazane to $SiO_2$.

In this invention, a polysilazane solution, which is soluble to a solvent such as xylene, can be easily coated on a substrate by using any coating techniques such as spin coating and dip coating. Polysilazane is a material that can be easily reacted into $SiO_2$ by sintering as shown in FIG. 3. Therefore, a special apparatus to control the reaction is not necessary. Namely, the sintering can be conducted using an inexpensive apparatus such as a furnace annealer. Thus, this method can provide a higher throughput without requiring expensive equipment.

Room temperature stress becomes compressive in $SiO_2$ films that are sintered at 900° C. or over (FIG. 4). Applying 900° C. or over sintering process to polysilazane film, thick $SiO_2$ film can be obtained without crack after multilayer formation.

BRIEF DESCRIPTION OF THE DRAWINGS

The invention will be explained in more detail in conjunction with the appended drawings, wherein.

DESCRIPTION OF THE PREFERRED EMBODIMENTS

A method for fabricating $SiO_2$ film in the preferred embodiment will be explained in FIGS. 1A to 1G.

Figure 1A:
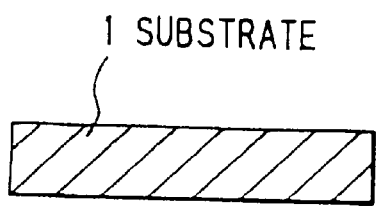
FIGS. 1A, 1B, 1C, 1D, 1E, 1F and 1G are cross sectional views showing a method for fabricating $SiO_2$ film in a preferred embodiment according to the invention.
Figure 1B:
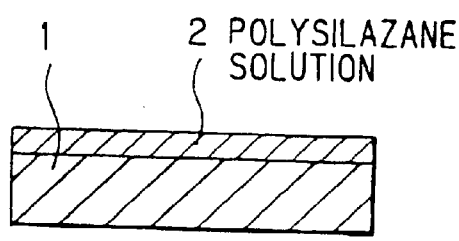
Figure 1C:
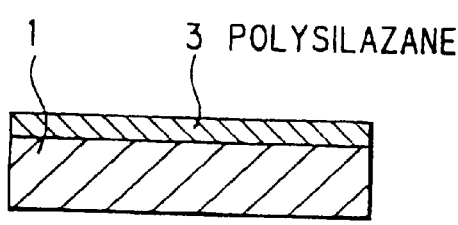
Figure 1D:
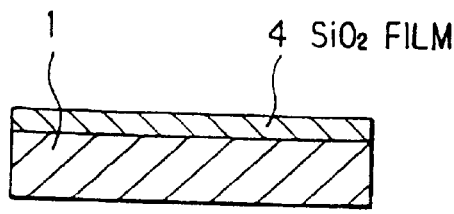
Figure 1E:
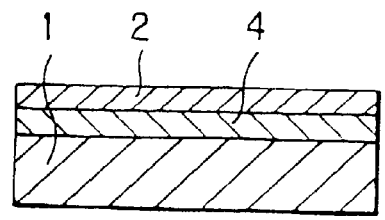
Figure 1F:
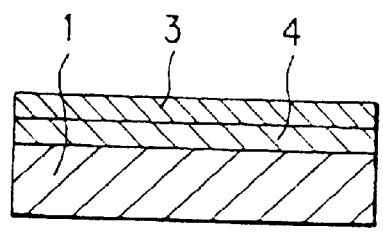
Figure 1G:
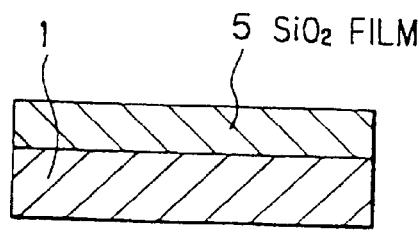

Referring to FIG. 1A, a silicon substrate 1 on which $SiO_2$ film is to be formed is first provided. Then, as shown in FIG. 1B, a polysilazane solution 2 is uniformly coated on the surface of the substrate 1. Then, a solvent included in the polysilazane solution 2 is evaporated by heating, thereby obtaining a polysilazane layer 3 (FIG. 1C). Then, by sintering the polysilazane layor 3, it is changed into $SiO_2$ film 4 through pyrolysis (FIG. 1D). Further, as shown in FIG. 1E, the polysilazane solution 2 is uniformly coated on the $SiO_2$ film 4 formed on the surface of the substrate 1. Then, the heating, thereby obtaining a polysilazane layer 3 (FIG. 1F). Then, by sintering the polysilazane layer 3 in FIG. 1F, it is changed into $SiO_2$ and combined with $SiO_2$ film in FIG. 1D. As a result, thick $SiO_2$ film 5 in FIG. 1G is formed on the substrate 1. Subsequently, by repeating the steps in FIGS. 1E to 1G, $SiO_2$ film with a desired thickness can be formed.

Figure 2A:
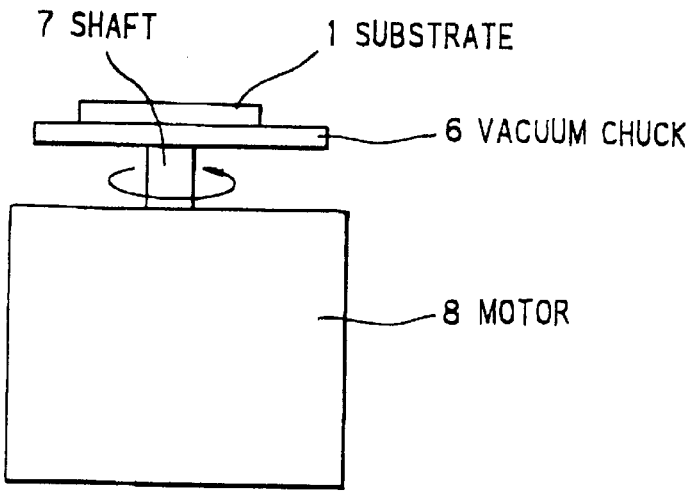
FIGS. 2A, 2B and 2C are illustrations showing equipment used for the method for fabricating $SiO_2$ film in the preferred embodiment.

Next, the specific operations in the steps shown in FIGS. 1A to 1G will be explained in FIGS. 2A to 2C. As shown in FIG. 2A, the silicon substrate 1 of 3-inch single-crystal silicon wafer is put on a vacuum chuck 6. The substrate 1 does not need always to be of single-crystal silicon, and it may be of any materials by which an optical waveguide can be formed. Further, the wafer size may be other than 3 inches.

Then, a 20 wt % polysilazane-xylene solution 2, which includes xylene as a solvent, is coated on the surface of the silicon substrate 1. 10 to 40 wt % polysilazane in xylene is preferable concentration to form $SiO_2$ film. When the concetration is lower than 10 wt %, the repeat number of the steps until having a desired film thickness must be increased as a film thickness obtained per one cycle becomes thinner. Also, when the concentration is higher than 40 wt %, the in-plane film thickness on the substrate may be frequently dispersed. The solvent does not need always to be xylene, and it may be any solvents that polysilazane can be dissolved in and can be easily evaporated in the temperature range of 60° C. to 120° C.

Then, actuating a motor 8, the silicon substrate 1 vacuumed against the vacuum chuck 6 is rotated with the vacuum chuck 6 around a shaft 7 connected with the motor 8. The rotation speed is preferably 2000 rpm to 4000 rpm. When it is lower than 2000 rpm, the in-plane film thickness of the substrate may be frequently dispersed.

Also, when it is higher than 4000 rpm, the repeat number of the steps until having a desired film thickness must be increased as a film thickness obtained per one cycle becomes thinner. The centrifugal force generated by the rotation allows the polysilazane-xylene solution 2 to be uniformly coated on the surface of the single-crystal silicon substrate 1.

Figure 2B:
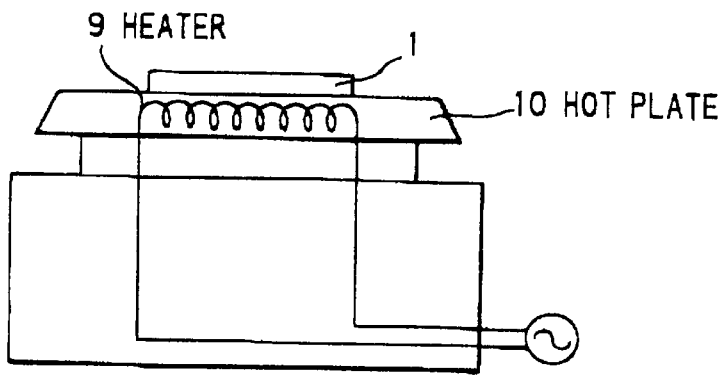

Then, as shown in FIG. 2B, the silicon substrate 1 that polysilazane-xylene solution 2 is coated on as shown in FIG. 1B is placed on a hot plate 10. The hot plate 10 is provided with a built-in heater 9 that can heat the silicon substrate 1 by flowing a current therethrough. Then, the silicon substrate 1 that polysilazane-xylene solution 2 is coated on is heated at 110° C. for 10 minutes. Thereby, xylene is evaporated and the polysilazane-xylene solution 2 on the silicon substrate 1 is changed into polysilazane 3. The heating temperature is preferably 90° C. to 130° C. When it is lower than 90° C., the solvent, xylene may not be completely evaporated even when the heating time is prolonged. Also, when it is higher than 130° C., polysilazane 3 may be partially reacted into $SiO_2$ even when the heating time is controlled to be shortened. This causes dispersion in the product. Meanwhile, the heating time is not fixed on 10 minutes, and it may be longer and shorter depending upon the heating temperature. In other words, the heating time is determined so that xylene can be completely evaporated and polysilazane can be prevented from reacting partially.

Figure 2C:
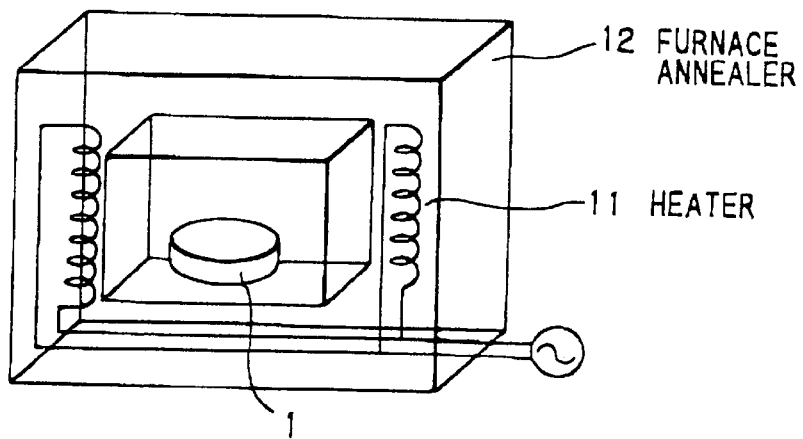
Figure 3:
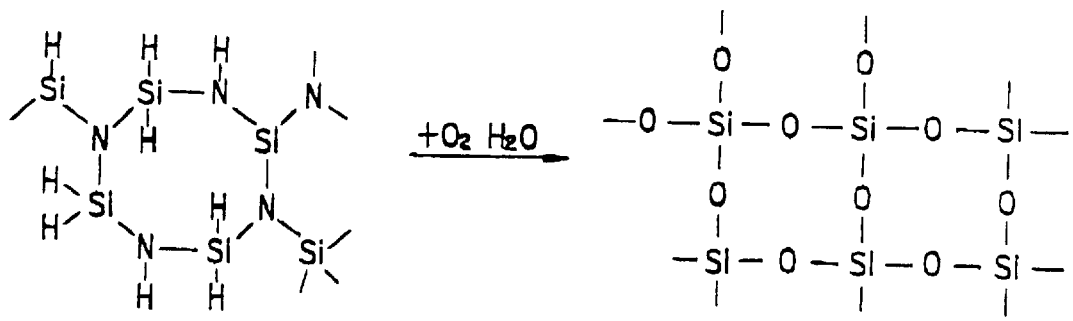
FIG. 3 shows chemical formula of polysilazane and $SiO_2$.

Then, the silicon substrate 1 that polysilazane 3 is coated on as shown in FIG. 1C is sintered for 5 to 10 minutes in a furnace annealer 12 shown in FIG. 2C that is in advance heated up to 1100° C. When the sintering time is shorter than 5 minutes, polysilazane 1 may not completely react to form $SiO_2$ film depending upon the atmosphere condition, such as humidity. Also, when the sintering time is longer than 10 minutes, the operation cycle time to form $SiO_2$ film becomes longer. Meanwhile, the furnace annealer 12 is provided with a built-in heater 11 to be heated by flowing a current.

Figure 4:
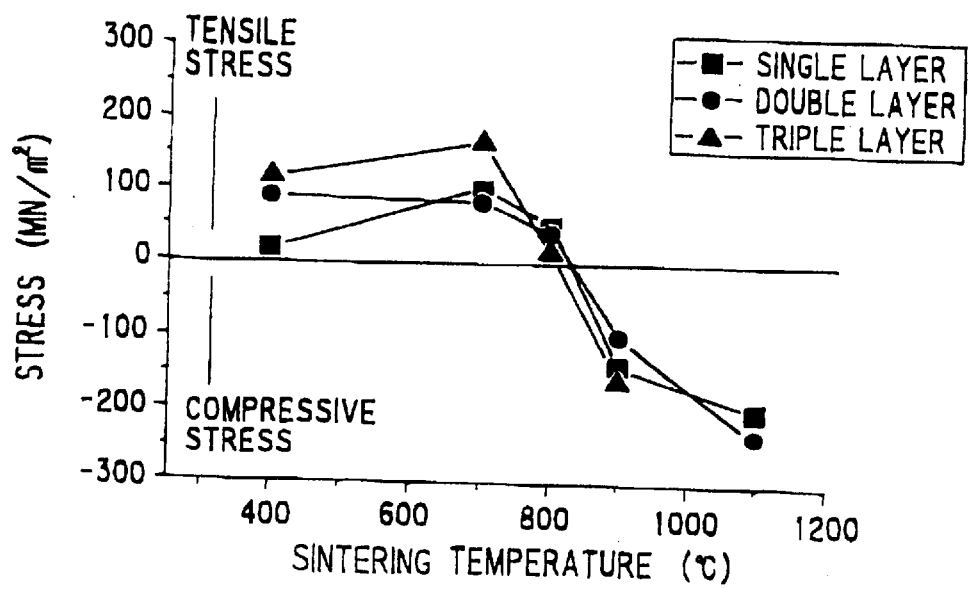
FIG. 4 shows $SiO_2$ film stress measured at room temperature after sintering at different temperatures.

The sintering temperature needs to be higher than 900° C. and lower than 1300° C. The reason why it needs to be higher than 900° C. will be appreciated by referring to FIG. 4. FIG. 4 shows $SiO_2$ film stress measured at room temperature after sintering at different temperatures. In FIG. 4, square marks (■) show film stress measured after the first layer formation, circle marks (●) show film stress measured after the second layer formation, and triangle marks (▲) show film stresses measured after the third layer formation. Referring to FIG. 4, it will be easily appreciated that some tensile stress remains inside $SiO_2$ film in the sintering temperature range of lower than 800° C. Also, it will be appreciated that the tensile stress increases with each layer. The increasing tensile stress will cause cracks after multilayer formation. In fact, after five layers (about 1.9 $\mu$m) formation, the coating cracked. However, the room temperature stress becomes compressive in films that are sintered at 900° C. Therefore, 900° C. or over sintering is needed to avoid cracks in thick film, especially over 10 $\mu$m thickness $SiO_2$ film for optical waveguide. The reason why the sintering temperature needs to be lower than 1300° C. is that the silicon's melting point is 1300° C. Namely, the upper limit of the sintering temperature is determined by the melting point of the substrate and $SiO_2$ film.

After sintering, the silicon substrate 1 is taken out of the furnace annealer 12 and cooled down at room temperature. In this case, it is desired that the silicon substrate 1 is, at first, put on another substrate with a heat resistivity greater than that of the silicon substrate 1, e.g., a silica substrate, and then it is heated with the laid-down substrate in the furnace annealer 12, thereafter taken out with the laid-down substrate and cooled down at room temperature. This can prevent the silicon substrate 1 from being cooled partially. When it is cooled down from a high temperature, e.g., 1100° C., there may occur a crack in $SiO_2$ film due to a possible non-uniform cooling condition.

Then, by repeating the above steps, $SiO_2$ film with a desired thickness can be obtained.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A method for fabricating $SiO_2$ film used as the core layer or cladding layer of an optical waveguide, comprising the steps of:

coating a polysilazane solution on a substrate wherein said solution comprises polysilazane and a solvent; and sintering said substrate at a predetermined temperature higher than 900° C. and lower than 1300° C. to form $SiO_2$ film on said substrate by using the pyrolysis reaction from polysilazane to $SiO_2$.

2. A method of fabricating $SiO_2$ film, according to claim 1, further comprising the step of:

evaporating the solvent of said polysilazane solution to form a polysilazane layer on said substrate after said coating step.

3. A method for fabricating $SiO_2$ film, according to claim 1, further comprising the steps of:

coating a polysilazane solution on said $SiO_2$ film formed on said substrate; and sintering said substrate at a predetermined temperature to form $SiO_2$ film on said previously formed $SiO_2$ film by using the pyrolysis reaction from polysilazane to $SiO_2$.

4. A method for fabricating $SiO_2$ film, according to claim 3, wherein:

said coating step and said sintering step are repeated in due order until obtaining $SiO_2$ film with a predetermined thickness.

5. A method for fabricating $SiO_2$ film, according to claim 4, wherein:

said predetermined thickness is thicker than 10 $\mu$m.

* * * * *